United States Patent
Li et al.

(10) Patent No.: US 10,416,680 B2
(45) Date of Patent: Sep. 17, 2019

(54) ANGLE FINDING FOR A DETECTOR HAVING A PAIRED STAGGERED ARRAY

(71) Applicant: Aptiv Technologies Limited, St. Michael (BB)

(72) Inventors: Zhengzheng Li, Agoura Hills, CA (US); Carlos Alcalde, Beverly Hills, CA (US)

(73) Assignee: APTIV TECHNOLOGIES LIMITED (BB)

( * ) Notice: Subject to any disclaimer, the term of this patent is extended or adjusted under 35 U.S.C. 154(b) by 0 days.

(21) Appl. No.: 15/680,803

(22) Filed: Aug. 18, 2017

(65) Prior Publication Data

US 2018/0267555 A1  Sep. 20, 2018

Related U.S. Application Data

(60) Provisional application No. 62/470,959, filed on Mar. 14, 2017.

(51) Int. Cl.

| | |
|---|---|
| *G05D 1/02* | (2006.01) |
| *G06K 9/00* | (2006.01) |
| *G01S 7/03* | (2006.01) |
| *G01S 13/42* | (2006.01) |
| *G01S 13/87* | (2006.01) |
| *G01S 13/93* | (2006.01) |

(Continued)

(52) U.S. Cl.
CPC .............. *G05D 1/0231* (2013.01); *G01S 7/03* (2013.01); *G01S 13/42* (2013.01); *G01S 13/878* (2013.01); *G01S 13/931* (2013.01); *G06K 9/00805* (2013.01); *H01Q 1/3233* (2013.01); *H01Q 1/3283* (2013.01); *H01Q 21/08* (2013.01); *H01Q 21/28* (2013.01); *H01Q 25/00* (2013.01)

(58) Field of Classification Search
CPC combination set(s) only.
See application file for complete search history.

(56) References Cited

U.S. PATENT DOCUMENTS

| | | | |
|---|---|---|---|
| 6,700,536 B1 * | 3/2004 | Wiegand | G01S 3/023 342/417 |
| 2005/0024261 A1 * | 2/2005 | Fujita | G01S 7/4026 342/174 |

(Continued)

FOREIGN PATENT DOCUMENTS

| | | |
|---|---|---|
| EP | 1 788 408 A1 | 5/2007 |
| WO | 2013/053467 A1 | 4/2013 |

*Primary Examiner* — Tsung Yin Tsai
(74) *Attorney, Agent, or Firm* — Lawrence D. Hazelton

(57) ABSTRACT

An illustrative example embodiment of a detector device, which may be useful on an automated vehicle, includes an array of detectors arranged in one dimension. The array includes a plurality of first detectors and a plurality of second detectors. The first detectors respectively have one of the second detectors between the first detector and an adjacent one of the first detectors. The first detectors respectively are spaced from the one of the second detectors by a first distance. The one of the second detectors are respectively spaced from the adjacent one of the first detectors by a second distance that is larger than the first distance. The first detectors are spaced from each other by a third distance that is a sum of the first and second distance. The second detectors are also spaced from each other by the third distance.

12 Claims, 4 Drawing Sheets

(51) Int. Cl.
    *H01Q 1/32*      (2006.01)
    *H01Q 21/08*     (2006.01)
    *H01Q 21/28*     (2006.01)
    *H01Q 25/00*     (2006.01)

(56) References Cited

U.S. PATENT DOCUMENTS

| | | | |
|---|---|---|---|
| 2007/0052581 A1* | 3/2007 | Shima | G01S 7/4021 |
| | | | 342/173 |
| 2009/0067286 A1* | 3/2009 | Bose | G01V 1/48 |
| | | | 367/38 |
| 2012/0242531 A1* | 9/2012 | Itoh | G01S 7/4026 |
| | | | 342/107 |
| 2015/0097717 A1* | 4/2015 | Tsai | G01S 3/74 |
| | | | 342/147 |
| 2015/0247924 A1* | 9/2015 | Kishigami | G01S 13/931 |
| | | | 342/70 |
| 2016/0091595 A1* | 3/2016 | Alcalde | G01S 13/4454 |
| | | | 342/175 |
| 2016/0104946 A1* | 4/2016 | Natsume | G01S 7/03 |
| | | | 342/88 |
| 2016/0146932 A1 | 5/2016 | Millar et al. | |
| 2016/0378117 A1* | 12/2016 | Szatmary | B25J 5/00 |
| | | | 382/153 |
| 2018/0231636 A1* | 8/2018 | Maher | G01S 13/931 |

* cited by examiner

ANGLE FINDING FOR A DETECTOR HAVING A PAIRED STAGGERED ARRAY

CROSS-REFERENCE TO RELATED APPLICATIONS

This application claims priority to U.S. Provisional Application No. 62/470,959, filed Mar. 14, 2017, the disclosure of which is incorporated by reference in its entirety.

BACKGROUND

Innovations in electronics and technology have made it possible to incorporate a variety of advanced features on automotive vehicles. Various sensing technologies have been developed for detecting objects or monitoring the surroundings in a vicinity or pathway of a vehicle. Such systems are useful for parking assist, lane departure detection and cruise control adjustment features, for example.

More recently, automated vehicle features have become possible to allow for autonomous or semi-autonomous vehicle control. Sensors for such systems may incorporate LIDAR (light detection and ranging) or radar for detecting an object or another vehicle in the pathway of or otherwise near the vehicle. Depending on the approach speed, the cruise control setting may be automatically adjusted to reduce the speed of the vehicle based on detecting another vehicle in the pathway of the vehicle, for example.

One aspect of such sensing technologies includes determining an angle associated with the detection for properly identifying the position of an object external to the vehicle. With known radar systems, angle resolution depends on the spacing between the detector elements and the overall antenna or receiver aperture. Automotive sensing devices typically have a small number of transmit and receive channels. These considerations have made the placement of radar or LIDAR detector elements critical to achieve a desired level of performance.

There are challenges associated with designing and utilizing such devices on automotive vehicles. While a larger aperture size can yield better angular discrimination, it does not come without a cost. Increasing the aperture size tends to introduce grating lobes in the spectrum especially when the array spacing is greater than one-half a wavelength as demonstrated by the Nyqist-Shannon sampling theorem. Typical radar detector design includes placing the detector elements in an array with a one-half wavelength spacing between them to avoid grating lobes.

Those skilled in the art are striving to improve various aspects of detectors useful on vehicles.

SUMMARY

An illustrative example embodiment of a detector device which may be useful on an automated vehicle, includes an array of detectors arranged in one dimension. The array includes a plurality of first detectors and a plurality of second detectors. The first detectors respectively have one of the second detectors between the first detector and an adjacent one of the first detectors. The first detectors respectively are spaced from the one of the second detectors by a first distance. The second detectors are respectively spaced from the adjacent one of the first detectors by a second distance that is larger than the first distance. The first detectors are spaced from each other by a third distance that is a sum of the first and second distance. The second detectors are also spaced from each other by the third distance.

An embodiment having one or more features of the detector device of the previous paragraph includes a processor that determines an angle of detection of the device. The processor is configured to determine a first estimate of the angle of detection from the plurality of first detectors. The processor is configured to determine a second estimate of the angle of detection from the plurality of second detectors. The processor determines the angle of detection from at least one of the first estimate or the second estimate.

In an example embodiment having one or more features of the detector device of either of the previous paragraphs, the processor is configured to determine a plurality of first estimates, determine a plurality of second estimates, identify which one of the first estimates is closest in value to one of the second estimates, and determine the angle of detection from at least one of the identified one of the first estimates and the identified one of the second estimates.

An example embodiment having one or more features of the detector device of any of the previous paragraphs includes a processor that determines an angle of detection of the device. The processor is configured to treat the array of detectors as a multiple-dimensional array wherein the first detectors are in a first dimension with the third distance between the first detectors, the second detectors are in a second dimension with the third distance between the second detectors, and the first dimension is spaced from the second dimension by the first distance. The processor is configured to determine respective detection angle estimates in each of the first and second dimensions and determine the angle of detection of the device based on the respective detection angle estimates.

In an example embodiment having one or more features of the detector device of any of the previous paragraphs, the processor is configured to determine a plurality of first detection angle estimates in the first dimension, determine a plurality of second detection angle estimates in the second dimension, and determine the angle of detection from at least one of the first detection angle estimates that corresponds to at least one of the second detection angle estimates.

In an example embodiment having one or more features of the detector device of any of the previous paragraphs, the processor is configured to determine the plurality of first detection angle estimates for a corresponding first plurality of intervals, wherein a number of the intervals in the first plurality of intervals is based on the third spacing. The processor is also configured to determine the plurality of second detection angle estimates for a corresponding second plurality of intervals, wherein a number of the intervals in the second plurality of intervals is based on the first distance.

In an example embodiment having one or more features of the detector device of any of the previous paragraphs, the processor is configured to identify which one of the first detection angle estimates is closest in value to one of the second detection angle estimates and determine the angle of detection based on at least one of the identified one of the first detection angle estimates and the identified one of the second detection angle estimates.

In an example embodiment having one or more features of the detector device of any of the previous paragraphs, the identified one of the first detection angle estimates is approximately equal to the identified one of the second detection angle estimates.

In an example embodiment having one or more features of the detector device of any of the previous paragraphs, the angle of detection is an angle in the one dimension.

In an example embodiment having one or more features of the detector device of any of the previous paragraphs, the detectors respectively comprise an antenna.

An illustrative example method of operating a detector device having one or more features of the detector device of any of the previous paragraphs includes determining a first estimate of an angle of detection from the plurality of first detectors, determining a second estimate of the angle of detection from the plurality of second detectors, and determining the angle of detection from at least one of the first estimate or the second estimate.

An example embodiment having one or more features of the method of the previous paragraph includes determining a plurality of first estimates, determining a plurality of second estimates, identifying which one of the first estimates is closest in value to one of the second estimates, and determining the angle of detection from at least one of the identified one of the first estimates and the identified one of the second estimates.

An example embodiment having one or more features of the method of either of the previous paragraphs includes using a processor to treat the array of detectors as a multiple-dimensional array wherein the first detectors are in a first dimension with the third distance between the first detectors, the second detectors are in a second dimension with the third distance between the second detectors, and the first dimension is spaced from the second dimension by the first distance. The processor is also used to determine respective detection angle estimates in each of the first and second dimensions and determine the angle of detection of the device based on the respective detection angle estimates.

An example embodiment having one or more features of the method of any of the previous paragraphs includes determining a plurality of first detection angle estimates in the first dimension, determining a plurality of second detection angle estimates in the second dimension, and determining the angle of detection from at least one of the first detection angle estimates that corresponds to at least one of the second detection angle estimates.

An example embodiment having one or more features of the method of any of the previous paragraphs includes determining the plurality of first detection angle estimates for a corresponding first plurality of intervals, wherein a number of the intervals in the first plurality of intervals is based on the third spacing, and determining the plurality of second detection angle estimates for a corresponding second plurality of intervals, wherein a number of the intervals in the second plurality of intervals is based on the first distance.

An example embodiment having one or more features of the method of any of the previous paragraphs includes identifying which one of the first detection angle estimates is closest in value to one of the second detection angle estimates and determining the angle of detection based on at least one of the identified one of the first detection angle estimates and the identified one of the second detection angle estimates.

In an example embodiment having one or more features of the method of any of the previous paragraphs, the identified one of the first detection angle estimates is approximately equal to the identified one of the second detection angle estimates.

In an example embodiment having one or more features of the method of any of the previous paragraphs, the angle of detection is an angle in the one dimension.

In an example embodiment having one or more features of the method of any of the previous paragraphs, the detectors respectively comprise an antenna.

Various features and advantages of at least one disclosed example embodiment will become apparent to those skilled in the art from the following detailed description. The drawings that accompany the detailed description can be briefly described as follows.

DETAILED DESCRIPTION

Figure 1:
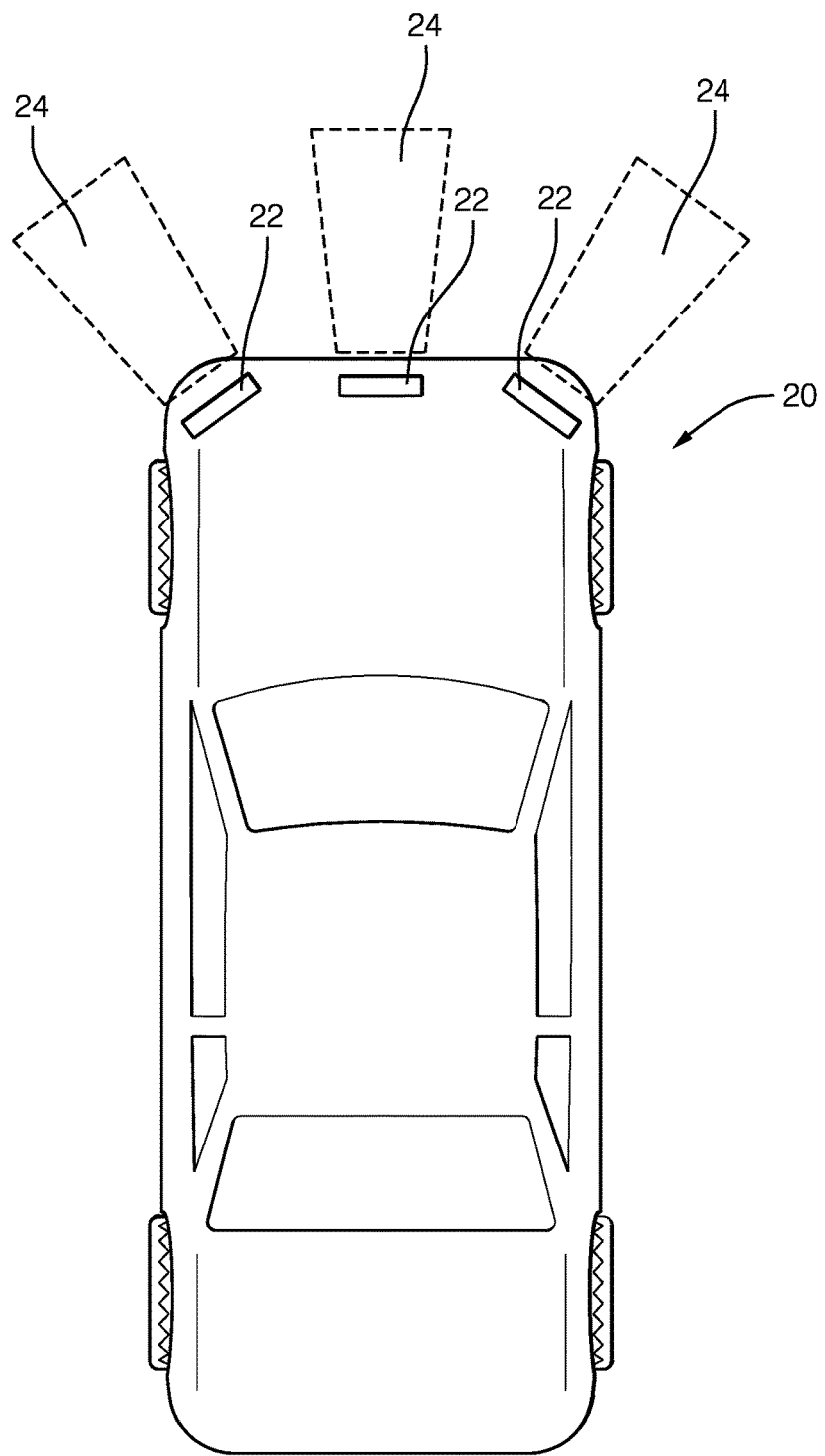
FIG. 1 schematically illustrates a plurality of detector devices designed according to an embodiment of this invention supported on a vehicle.

FIG. 1 schematically illustrates selected portions of a vehicle 20. A plurality of detector devices 22 are situated on the vehicle to provide information regarding the vicinity or surroundings of the vehicle. The detectors 22 in some embodiments utilize radar while in other embodiments the detectors utilize LIDAR. Each of the detector devices 22 has an associated field of view 24, which defines the area or scope of detection provided by that device. A variety of arrangements of such detector devices on a vehicle including or different than the arrangements schematically shown in FIG. 1 may be used. The detector devices 22 may be used to assist a driver of the vehicle 20, to provide semi-autonomous vehicle control or to facilitate operating the vehicle 20 as an automated vehicle.

Figure 2:
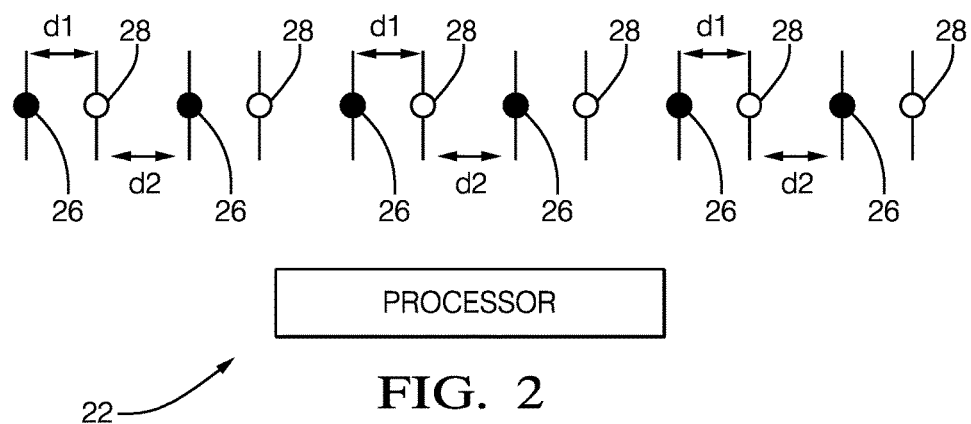
FIG. 2 schematically illustrates selected portions of a detector device designed according to an embodiment of this invention.

FIG. 2 schematically illustrates an example configuration of a detector device 22. In this example, an array of detectors is arranged in one dimension. The array of detectors includes a plurality of first detectors 26 and a plurality of second detectors 28. Each of the detectors 26 and each of the detectors 28 comprises an antenna in this example.

The arrangement of the detectors 26 and 28 in the one dimension includes spacing between detectors that facilitates angle detection or determination with improved accuracy. As can be appreciated from FIG. 2, the first detectors 26 and second detectors 28 are arranged in a staggered pattern where every other detector is one of the first detectors 26 or one of second detectors 28. Stated another way, the first detectors 26 respectively have one of the second detectors 28 between that first detector and an adjacent one of the first detectors 26. Similarly, the second detectors 28 respectively have one of the first detectors 26 between it and an adjacent one of the second detectors 28.

As shown in FIG. 2, the first detectors 26 are respectively spaced from an adjacent one of the second detectors 28 by a first distance d1. That second detector 28 is spaced from a next one of the first detectors 26 by a second distance d2. The total distance or spacing between each first detector 26 and the adjacent first detector 26 is a sum of the first distance and the second distance or a third distance d1+d2. Similarly, each second detector 28 is spaced from an adjacent one of the second detectors 28 by the third distance d1+d2.

The spacing or separation between the detectors may be considered to establish two linear arrays with the individual detectors of each array staggered or alternatingly spaced with the others. When a spacing d is required to avoid grating lobes within a desired field of vision, the distance d1 is set to a value of N×d and the distance d2 is set to a value (N+1)×d, where N is an integer. In examples where d is one-half a wavelength, d1 and d2 may be one-half a wavelength and one wavelength, respectively, or one wavelength and 1.5 wavelength, respectively. Larger values of N allow for achieving larger apertures.

Figure 3:
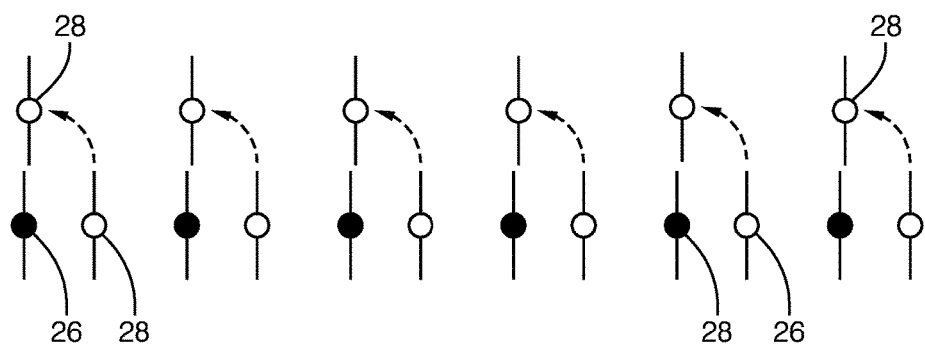
FIG. 3 schematically illustrates a manner in which a processor of the illustrated example device of FIG. 2 treats the detectors during an angle determination process designed according to an embodiment of this invention.
Figure 4:
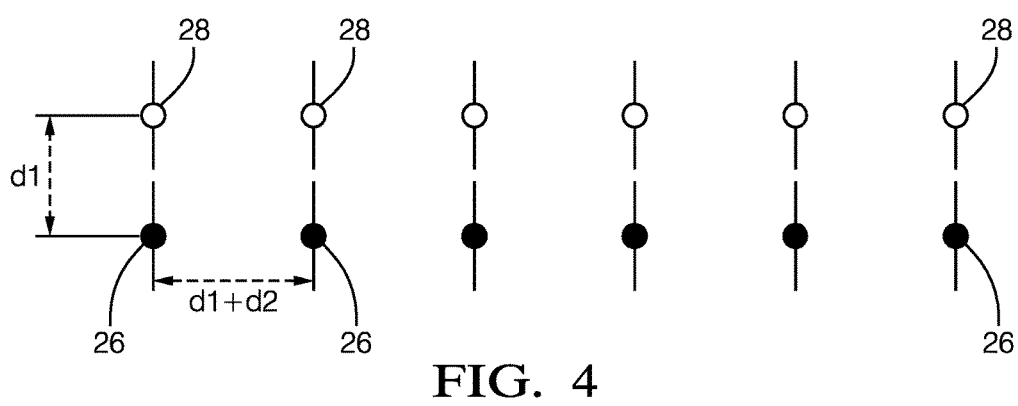
FIG. 4 schematically illustrates how detectors situated in one dimension can be treated as though they are in multiple dimensions for an angle determination process designed according to an embodiment of this invention.

The spacing arrangement of the detectors in the example of FIG. 2 allows for a processor 30 of the detector device 22 to treat the detectors in the one dimensional array as if they are arranged in a multiple dimensional array. As schematically shown in FIGS. 3 and 4, the processor 30 treats the second detectors 28 as if they are spaced from the first detectors 26 by the first distance d1 but are situated in a second dimension instead of in the first dimension. Each of the second detectors 28 in the second dimension are spaced by the third distance d1+d2 and spaced from a corresponding one of the first detectors 26 by the first distance d1 as can be appreciated from FIG. 4.

The positions shown in FIGS. 3 and 4 are not the physical arrangement of the detectors in the detector device 22. Instead, FIGS. 3 and 4 schematically illustrate the manner in which the processor 30 is programmed or configured to treat those detectors during an angle of detection determination process. By treating the first and second detectors in the manner schematically shown in FIGS. 3 and 4, the processor 30 is able to apply a known multiple-dimensional angle determination technique for purposes of finding the angle of detection in the one dimension of the actual, physical array of the detectors as schematically shown in FIG. 2.

Figure 5:
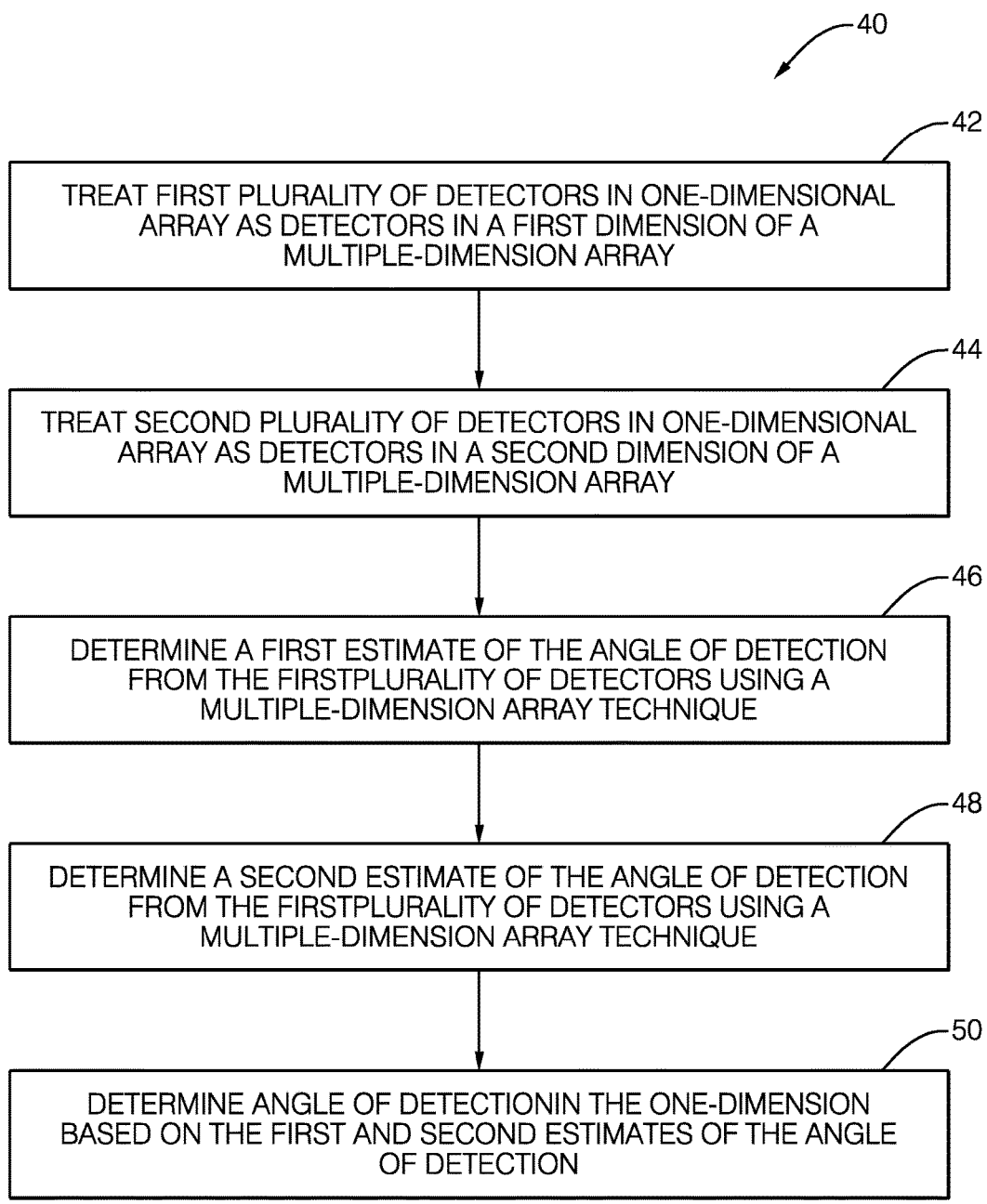
FIG. 5 is a flowchart diagram summarizing an example process of angle detection designed according to an embodiment of this invention.

FIG. 5 includes a flowchart diagram 40 that summarizes an example angle of detection determination approach. At 42, the processor 30 treats the plurality of first detectors in the one dimensional array as detectors in a first dimension of a multiple-dimension array. At 44, the processor 30 treats the plurality of second detectors 28 in the one dimensional array as detectors in a second dimension of a multiple-dimension array. At 46, the processor 30 uses a known angle determination technique to determine a first estimate of the angle of detection of the device 22 from the plurality of first detectors 26. The first estimate of the angle of detection determined at 46 may be considered, for example, an estimated azimuth angle of a two-dimensional array.

At 48, the processor 30 determines a second estimate of the angle of detection from the plurality of second detectors 28 using the same multiple-dimension array angle determination technique. The second estimate of the angle of detection may be considered as though it were an elevation angle determination in a multiple-dimensional array configuration. Of course, the actual configuration of the detector device 22 is a one-dimensional array so the angle estimates are actually both in the one dimension rather than being in two different dimensions or directions.

In one example, the processor 30 uses a known Fast Fourier Transform (FFT) angle finding algorithm for single target applications. In another example, the processor 30 is programmed or configured to use a two-dimensional unitary Esprit angle finding algorithm for multiple targets. Given this description, those skilled in the art will be able to select an appropriate multiple-dimension angle determination algorithm that suits their particular needs.

Figure 6:
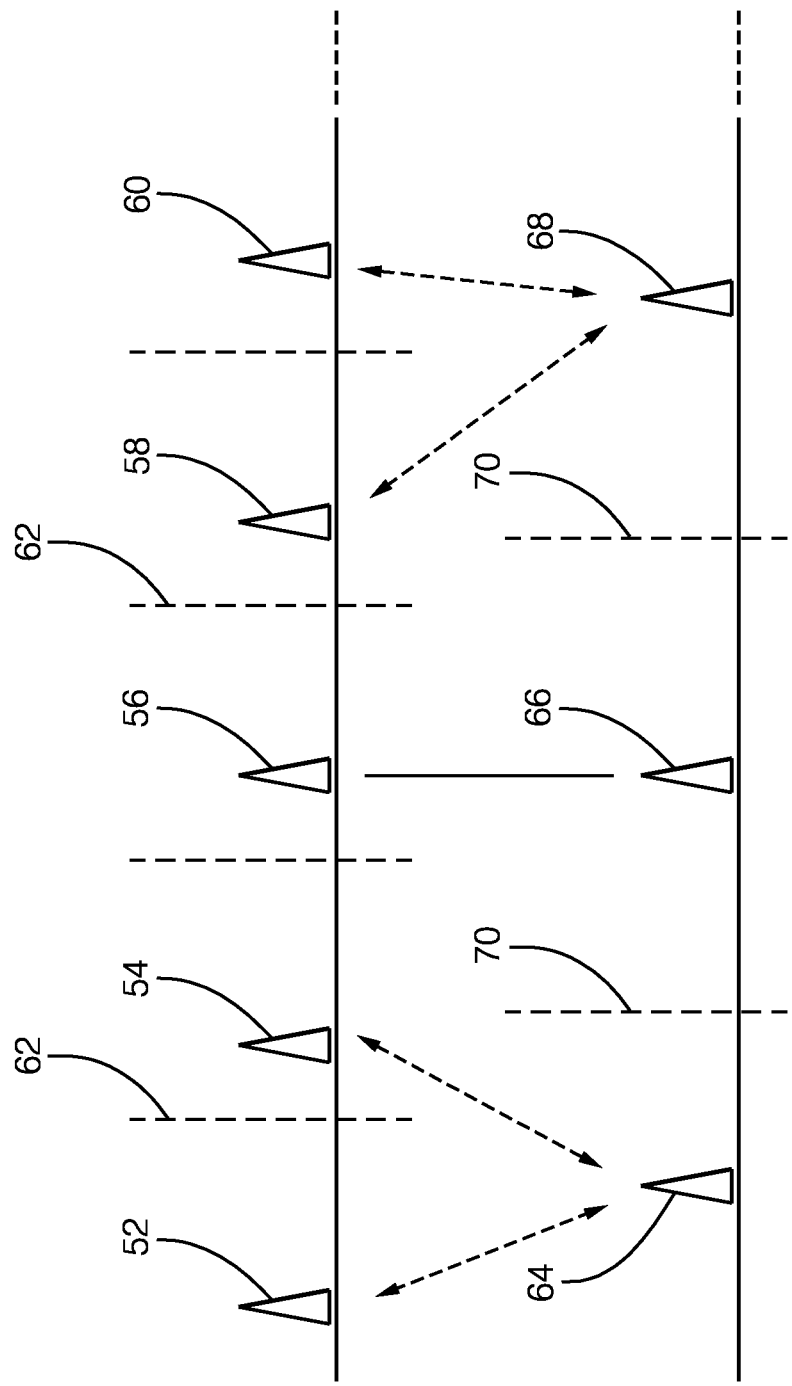
FIG. 6 schematically illustrates a portion of an example angle determination.

At 50, the processor 30 determines the angle of detection of the detector device 22 in the one dimension based on the first and second estimates of the angle of detection determined at 46 and 48, respectively. FIG. 6 schematically illustrates one example approach for using the two estimates for determining the angle of detection of the device 22. A plurality of angle estimates in a first dimension are shown at 52, 54, 56, 58 and 60. These are each a first estimate of the angle of detection. Each of the angle estimates in the first dimension are associated with an interval schematically separated by the broken lines 62. The size or number of intervals having corresponding first estimates of the angle of detection is based on the spacing d1+d2 between the first detectors 26.

FIG. 6 shows a plurality of second estimates of the angle of detection at 64, 66 and 68. Each of those estimates are associated with a corresponding interval schematically divided by the lines 70. The number of intervals in the plurality of intervals having corresponding second estimates of the angle of detection is based on the spacing d1 in this example.

The processor 30 is programmed or configured to determine which of the first estimates obtained from the plurality of first detectors 26 most closely corresponds to one of the second estimates from the second detectors 28. In the example of FIG. 6, the first estimates 52 and 54 approximately correspond to the second estimate 64 and the first estimates 58 and 60 approximately correspond to the second estimate 68. The first estimate 56 is essentially the same as the second estimate 66 in this example. Given the correspondence between those two estimates, the value or angle of either the first estimate 56 or the second estimate 66 is selected by the processor 30 as the angle of detection of the device 22. In some examples, the processor 30 requires an exact match between at least one of the first estimates and at least one of the second estimates for determining that angle as the angle of detection. In other embodiments, when a first estimate is within a selected range of a corresponding second estimate, such correspondence is considered sufficient for identifying one of those estimates as the angle of detection.

By treating different ones of the detectors 26 and 28 as a plurality of detectors in different dimensions as described above, the example device 22 provides two estimates of the angle of detection based on the first spacing d1 and the third spacing d1+d2. Both estimates are aliased as if they were obtained from spacings larger than the maximum which avoids grating lobes. In effect, the angle estimates from the distances d1 and d1+d2 are first unfolded to two sets of angles defined by d1 and d1+d2, respectively, then the best match between the two sets of estimates is found and identified as the angle of detection from the d1+d2 spacing.

The paired staggered array configuration and the manner in which the processor 30 determines the angle of detection allows for better angle discrimination by effectively expanding the detector array aperture without introducing the problems associated with grating lobes. Additionally, the disclosed example embodiment allows for maintaining a linear array configuration, which facilitates MIMO setup such that increased accuracy is possible without increasing complexity.

The example detector device configuration of the disclosed example embodiment provides increased angle detection accuracy and introduces the possibility of a larger variety of detector configurations.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A detector device, comprising:
an array of detectors arranged in one dimension, the array including a plurality of first detectors and a plurality of second detectors, the first detectors respectively having one of the second detectors between the first detector and an adjacent one of the first detectors, the first detectors respectively being spaced from the one of the second detectors by a first distance d1, the one of the second detectors respectively being spaced from the adjacent one of the first detectors by a second distance d2 that is larger than the first distance, the first detectors being spaced from each other by a third distance d1+d2 that is a sum of the first and second distance, the second detectors being spaced from each other by the third distance; and
a processor that determines an angle of detection of the device, the processor being configured to:
treat the array of detectors as a multiple-dimensional array wherein
the first detectors are in a first dimension with the third distance between the first detectors,
the second detectors are in a second dimension with the third distance between the second detectors,
and the first dimension is spaced from the second dimension by the first distance;
determine a plurality of first detection angle estimates in the first dimension;
determine a plurality of second detection angle estimates in the second dimension; and
determine the angle of detection from at least one of the first detection angle estimates that corresponds to at least one of the second detection angle estimates.

2. The device of claim 1, wherein the processor is configured to
determine the plurality of first detection angle estimates for a corresponding first plurality of intervals, wherein a number of the intervals in the first plurality of intervals is based on the third spacing; and
determine the plurality of second detection angle estimates for a corresponding second plurality of intervals, wherein a number of the intervals in the second plurality of intervals is based on the first distance.

3. The device of claim 1, wherein the processor is configured to
identify which one of the first detection angle estimates is closest in value to one of the second detection angle estimates; and
determine the angle of detection based on at least one of the identified one of the first detection angle estimates and the identified one of the second detection angle estimates.

4. The device of claim 3, wherein the identified one of the first detection angle estimates is approximately equal to the identified one of the second detection angle estimates.

5. The device of claim 1, wherein the angle of detection is an angle in the one dimension.

6. The device of claim 1, wherein the detectors respectively comprise an antenna.

7. A method of operating a detector device, the device including a processor and an array of detectors arranged in one dimension, the array including a plurality of first detectors and a plurality of second detectors, the first detectors respectively having one of the second detectors between the first detector and an adjacent one of the first detectors, the first detectors respectively being spaced from the one of the second detectors by a first distance d1, the one of the second detectors respectively being spaced from the adjacent one of the first detectors by a second distance d2 that is larger than the first distance, the first detectors being spaced from each other by a third distance d1+d2 that is a sum of the first and second distance, the second detectors being spaced from each other by the third distance, the method comprising:
using the processor to:
treat the array of detectors as a multiple-dimensional array wherein
the first detectors are in a first dimension with the third distance between the first detectors,
the second detectors are in a second dimension with the third distance between the second detectors, and
the first dimension is spaced from the second dimension by the first distance;
determining a plurality of first detection angle estimates of an angle of detection in the first dimension from the plurality of first detectors;
determining a plurality of second detection angle estimates of the angle of detection in the second dimension from the plurality of second detectors;
and
determining the angle of detection from at least one of the first estimate detection angle estimates that corresponds to at least one of the second detection angle estimates.

8. The method of claim 7, comprising
determining the plurality of first detection angle estimates for a corresponding first plurality of intervals, wherein a number of the intervals in the first plurality of intervals is based on the third spacing; and
determining the plurality of second detection angle estimates for a corresponding second plurality of intervals, wherein a number of the intervals in the second plurality of intervals is based on the first distance.

9. The method of claim 7, comprising
identifying which one of the first detection angle estimates is closest in value to one of the second detection angle estimates; and
determining the angle of detection based on at least one of the identified one of the first detection angle estimates and the identified one of the second detection angle estimates.

10. The method of claim 9, wherein the identified one of the first detection angle estimates is approximately equal to the identified one of the second detection angle estimates.

11. The method of claim 7, wherein the angle of detection is an angle in the one dimension.

12. The method of claim 7, wherein the detectors respectively comprise an antenna.

* * * * *